United States Patent
Han et al.

(10) Patent No.: US 9,246,143 B2
(45) Date of Patent: Jan. 26, 2016

(54) RECHARGEABLE BATTERY MODULE

(71) Applicant: SAMSUNG SDI CO., LTD., Yongin-si, Gyeonggi-do (KR)

(72) Inventors: Min-Yeol Han, Yongin-si (KR); Sang-Won Byun, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 317 days.

(21) Appl. No.: 13/780,147

(22) Filed: Feb. 28, 2013

(65) Prior Publication Data
US 2013/0337306 A1  Dec. 19, 2013

(30) Foreign Application Priority Data
Jun. 19, 2012 (KR) .................. 10-2012-0065678

(51) Int. Cl.
*H01M 2/10* (2006.01)
*H01M 2/20* (2006.01)

(52) U.S. Cl.
CPC .......... *H01M 2/1016* (2013.01); *H01M 2/1022* (2013.01); *H01M 2/1072* (2013.01); *H01M 2/202* (2013.01); *H01M 2/20* (2013.01)

(58) Field of Classification Search
CPC ................................. H01M 2/20; H01M 2/202
See application file for complete search history.

(56) References Cited

U.S. PATENT DOCUMENTS

2010/0279170 A1  11/2010  Lee et al.
2011/0300433 A1*  12/2011  Kim ............................ 429/159

FOREIGN PATENT DOCUMENTS

JP  2009-064630    3/2009
JP  2011-49148 A    3/2011

* cited by examiner

*Primary Examiner* — Jane Rhee
(74) *Attorney, Agent, or Firm* — Lee & Morse, P.C.

(57) ABSTRACT

A rechargeable battery module, including unit cells that are adjacent to each other, each of the unit cells being configured as a rechargeable battery and including a first electrode terminal, a second electrode terminal, and a case that is electrically connected to the second electrode terminal, an insulation film on at least one side among all sides of the unit cells, and a conductive member on a side of the insulation film, the conductive member being electrically connected to the first electrode terminal of at least one of the unit cells.

18 Claims, 7 Drawing Sheets

RECHARGEABLE BATTERY MODULE

CROSS-REFERENCE TO RELATED APPLICATION

This application claims priority under 35 U.S.C. §119 to Korean Patent Application No. 10-2012-0065678, filed in the Korean Intellectual Property Office on Jun. 19, 2012, and entitled "Rechargeable Battery Module," the entire contents of which are incorporated herein by reference.

BACKGROUND

1. Field

Embodiments are related to a rechargeable battery module.

2. Description of the Related Art

A rechargeable battery is a battery which may be repetitively charged and discharged, whereas a primary battery may not be able to be repetitively charged and discharged. A small capacity rechargeable battery may be used in a small portable electronic device such as a mobile phone, a laptop computer, or a camcorder and a large capacity rechargeable battery may be used as a power supply for a motor driving of a hybrid vehicle and an electric vehicle.

SUMMARY

Embodiments are directed to a rechargeable battery module, including unit cells that are adjacent to each other, each of the unit cells being configured as a rechargeable battery and including a first electrode terminal, a second electrode terminal, and a case that is electrically connected to the second electrode terminal, an insulation film on at least one side among all sides of the unit cells, and a conductive member on a side of the insulation film, the conductive member being electrically connected to the first electrode terminal of at least one of the unit cells.

The unit cells may be connected to each other by busbars, a first final terminal may be connected to the first electrode terminal of a first unit cell at a first side of the rechargeable battery module, and a second final terminal may be connected to the second electrode terminal of a second unit cell at a second side of the rechargeable battery module, the second side being opposite first side.

The rechargeable battery module may further include a connection member, wherein a first side of the connection member may be connected to the conductive member and a second side of the connection member may be connected to the first final terminal so that the conductive member has a same polarity as the first electrode terminal of the first unit cell.

The rechargeable battery module as claimed may further include a connection member, wherein the unit cells may be connected to each other by busbars, and a first side of the connection member may be connected to the conductive member and a second side of the connection member may be connected to the first electrode terminal of a first unit cells so that the conductive member has a same polarity as the first electrode terminal of the first unit cell.

The first electrode terminal of each of the units cells and the conductive member may have a first polarity, the second electrode terminal and the case of each of the unit cells may have a second polarity, and the first polarity may be different than the second polarity.

The insulation film may surround all sides of the unit cells.

The conductive member may surround the insulation film.

The unit cells may be arranged in an arrangement direction, and the insulation film may include a first insulation film at a first side of the unit cells along the arrangement direction, and a second insulation film at a second side of the unit cells, opposite the first side, along the arrangement direction.

The conductive member may include a first conductive member on the first insulation film, and a second conductive member on the second insulation film.

The rechargeable battery module may further include a first connection member and a second connection member, wherein the unit cells may be connected to each other by busbars, a first side of the first connection member may be connected to the first conductive member and a second side of the first connection member may be connected to the first electrode terminal of a first unit cell so that the first conductive member has a same polarity as the first electrode terminal of the first unit cell, and a first side of the second connection member may be connected to the second conductive member and a second side of the second connection member may be connected to the first electrode terminal of a second unit cell so that the second conductive member has a same polarity as the first electrode terminal of the second unit cell.

The first connection member may be on a third side of the unit cells in a crossing direction crossing the arrangement direction, and the second connection member may be on a fourth side of the unit cells, opposite the third side, in the crossing direction.

The rechargeable battery module may further include a third insulation film between the first connection member and the unit cells at the third side, and a fourth insulation film between the second connection member and the unit cells at the fourth side.

The first connection member may overlap each of the unit cells on the third side, and the second connection member may overlap each of the unit cells on the fourth side.

The first connection member and the first conductive member may be integrally formed, and the second connection member and the second conductive member may be integrally formed.

The first insulation film may be on the second unit cell and the second insulation film may be on the first unit cell.

A first final terminal may be connected to the first electrode terminal of the first unit cell and the first connection member may be connected to the first electrode terminal of the first unit cell through the first final terminal, and a first busbar of the busbars may be connected to the first electrode terminal of the second unit cell and the second connection member may be connected to the first electrode terminal of the second unit cell through the first busbar.

The case of each unit cell may be electrically insulated from the cases of the other unit cells.

The conductive member may be electrically connected to the first electrode terminals of at least two of the unit cells.

The first electrode terminals of the at least two of the unit cells may have a same polarity.

The rechargeable battery may be inside an enclosure, and a second insulating film may be between the conductive member and the enclosure.

BRIEF DESCRIPTION OF THE DRAWINGS

Features will become apparent to those of skill in the art by describing in detail exemplary embodiments with reference to the attached drawings in which.

DESCRIPTION OF SYMBOLS

Figure 1:
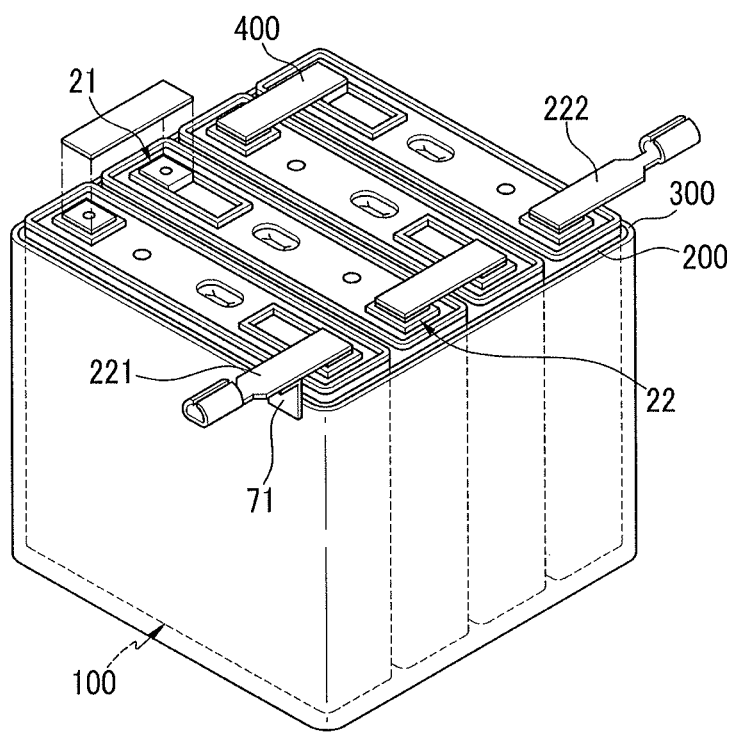
FIG. 1 illustrates a perspective view of a rechargeable battery module according to an embodiment.

10: Electrode assembly
11: First electrode (e.g., negative electrode)
11a, 12a: Coated regions
11b, 12b: Uncoated regions
12: Second electrode (e.g., positive electrode)
13: Separator
15: Case
20: Cap plate
21: First electrode terminal (e.g., negative terminal)
21a, 22a: Rivet terminals
21b, 22b: Flanges
21c, 22c: Plate terminals
22: Second electrode terminal (e.g., positive terminal)
31: Insulation member
36, 37: Gaskets (e.g., negative and positive gaskets)
40: External short-circuit part
41: Short-circuit tab
42: Short-circuit hole
43: Short-circuit member
46: Top plate
51, 52: Electrode lead tabs (e.g., negative and positive electrode lead tabs)
61, 62: Insulation members (e.g., negative and positive insulation members)
71: Connection member
72: Conductive foreign object (e.g., nail)
100: Unit cells
200, 210: Insulation films
211, 212: First and second insulation films
213, 214: Third and fourth insulation films
221: First final terminal (e.g., final negative terminal)
222: Second final terminal (e.g., final positive terminal)
271, 272: First and second connection members
300, 310: Conductive members
311, 312: First and second conductive members
400: Busbar
H1, H2: Terminal holes

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or element, or intervening layers or elements may also be present. Further, it will be understood that when a layer or element is referred to as being "under" another layer or element, it can be directly under, and one or more intervening layers or elements may also be present. In addition, it will also be understood that when a layer or element is referred to as being "between" two layers or elements, it can be the only layer or element between the two layers or elements, or one or more intervening layers or elements may also be present. Like reference numerals refer to like layers or elements throughout.

Figure 2:
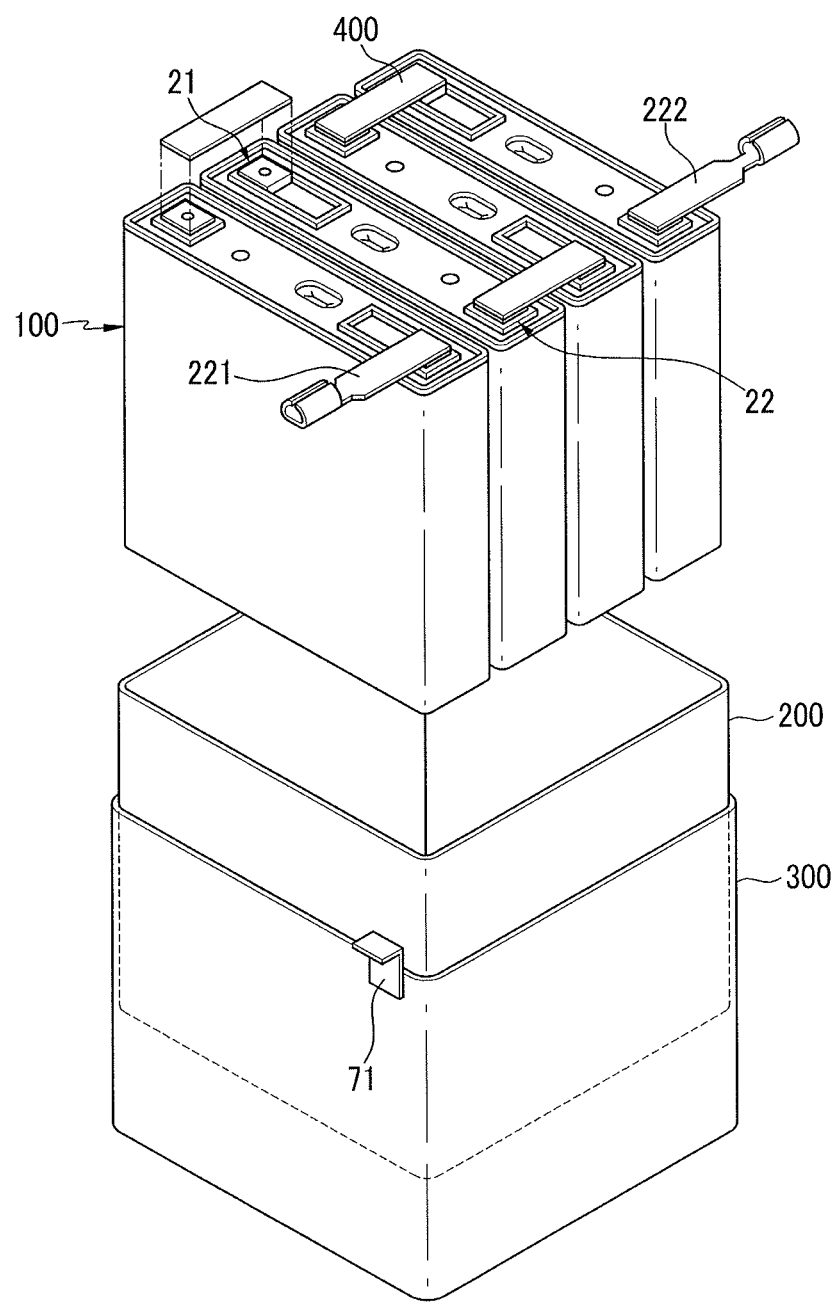
FIG. 2 illustrates an exploded perspective view of the rechargeable battery module illustrated in FIG. 1.

FIG. 1 illustrates a perspective view of a rechargeable battery module according an embodiment. FIG. 2 illustrates an exploded perspective view of the rechargeable battery module illustrated in FIG. 1.

Referring to FIGS. 1 and 2, the rechargeable battery module according to an embodiment may include unit cells 100 configured as rechargeable batteries, an insulation film 200 disposed on at least one side of the sides of the unit cells 100, and a conductive member 300 disposed adjacent to the insulation film 200, opposite the unit cells 100.

The insulation film 200 may be disposed to surround all of the sides of the unit cells 100. The conductive member 300 may be disposed to surround the insulation film 200, and thus may be electrically insulated from the unit cells 100.

Figure 3:
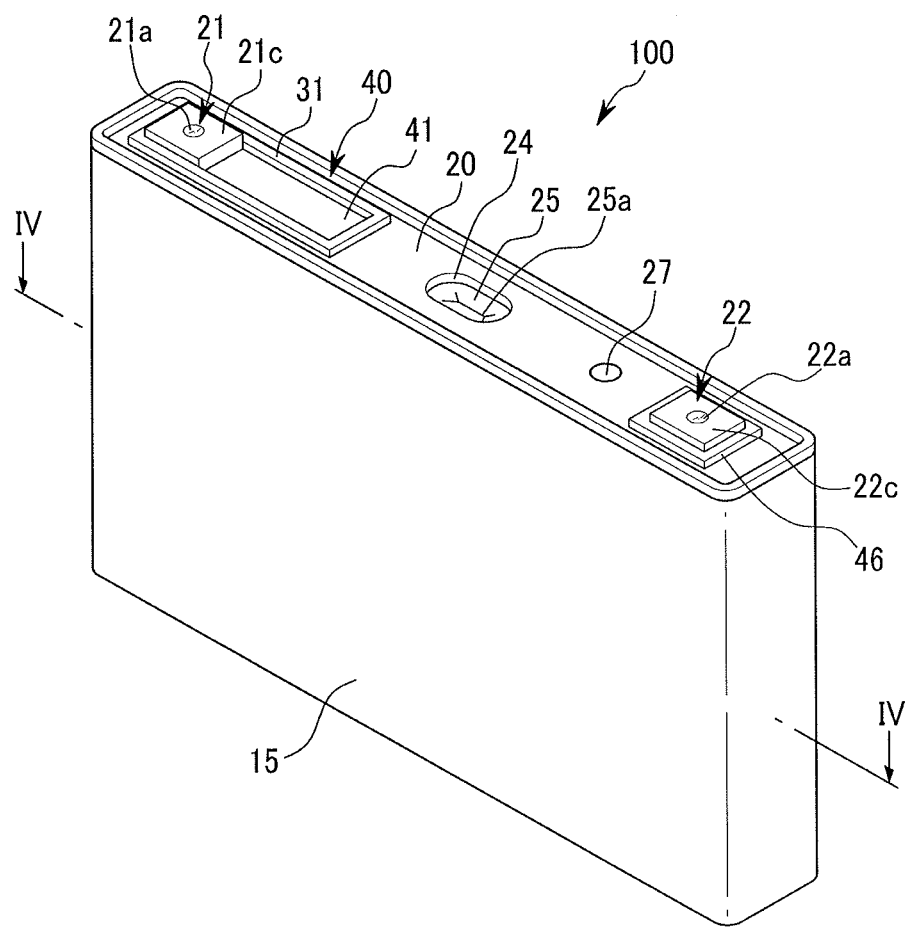
FIG. 3 illustrates a perspective view of one of the unit cells in FIG. 1.
Figure 4:
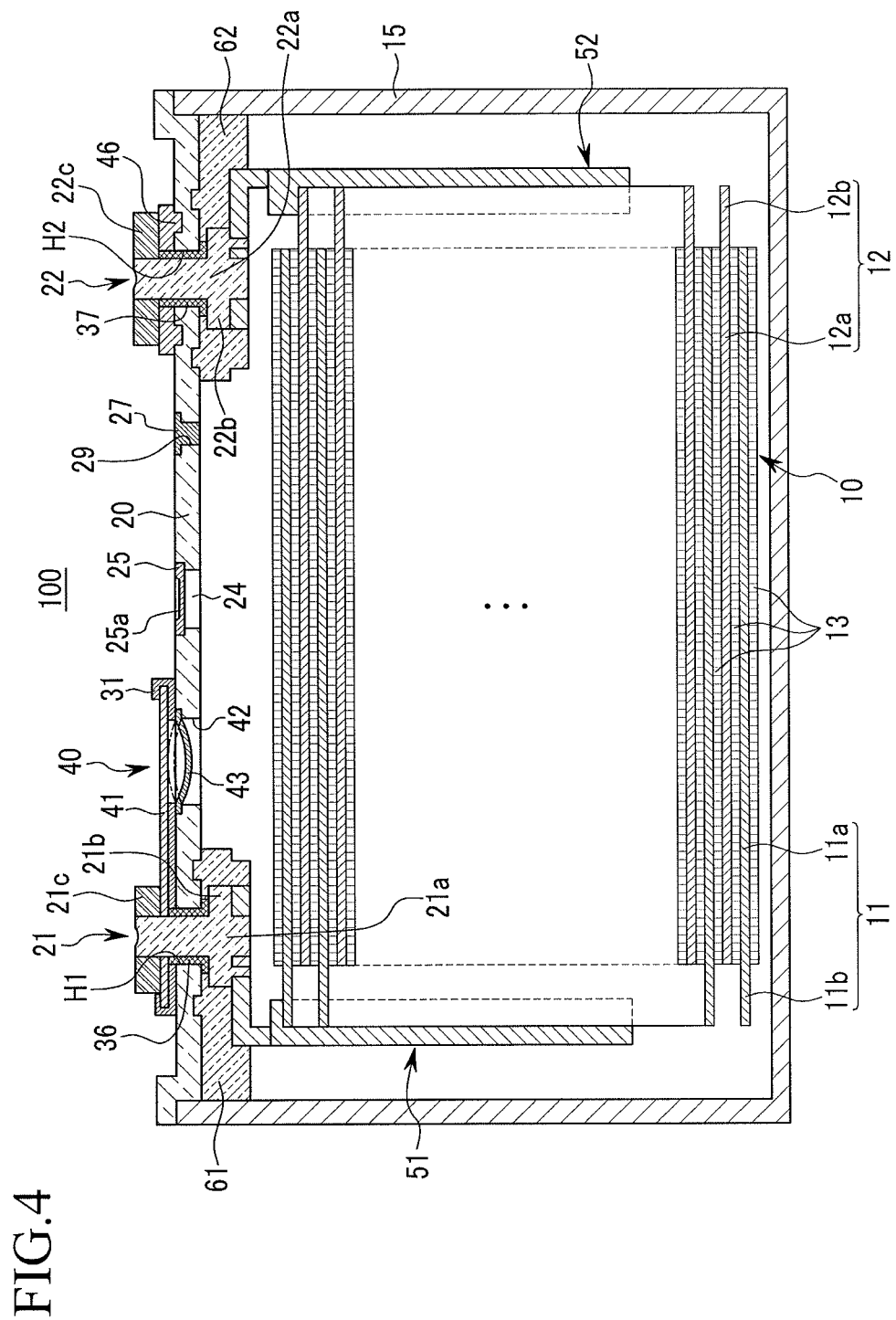
FIG. 4 illustrates a cross-sectional view taken along line IV-IV of FIG. 3.

FIG. 3 illustrates a perspective view of one of the unit cells 100 in FIG. 1. FIG. 4 illustrates a cross-sectional view taken along line IV-IV of FIG. 3.

Referring to FIGS. 3 and 4, the unit cell 100 may include an electrode assembly 10 for charging and discharging current, a case 15 embedding the electrode assembly 10 (i.e., the electrode assembly 10 is in the case 15), a cap plate 20 connected to an opening of the case 15, a first electrode terminal 21 (hereinafter, referred to as a "negative terminal," though the first electrode terminal 21, and other parts referred to as being negative, may also be a positive) installed on the cap plate 20, a second electrode terminal 22 (hereinafter, referred to as a "positive terminal," though the second electrode terminal 22, and other parts referred to as being positive, may also be a negative), and an external short-circuit part 40 disposed at the negative terminal 21 side.

The electrode assembly 10 may be formed, for example, by disposing a first electrode 11 (hereinafter, referred to as a "negative electrode") and a second electrode 12 (hereinafter, referred to as a "positive electrode") on both sides of a separator 13 which is an insulator and winding (e.g., rewinding) the negative electrode 11, the separator 13 and the positive electrode 12 (e.g., in a jelly roll state). The negative electrode 11, the positive electrode 12, and separator 13 may also be layered (i.e., without winding) to form the electrode assembly.

The negative electrode 11 and the positive electrode 12 may respectively include coated regions 11a and 12a coated with an active material on a current collector of a metal plate, and uncoated regions 11b and 12b formed of an exposed current collector without the active material coating.

The uncoated region 11b of the negative electrode 11 may be formed at one end of the negative electrode 11 along the negative electrode 11. The uncoated region 12b of the positive electrode 12 may be formed at one end of the positive electrode 12 along the positive electrode 12. The uncoated regions 11b and 12b may be disposed at both ends (e.g., opposite ends) of the electrode assembly 10, respectively.

The case 15 may have an approximately cuboid shape, and may provide a space for receiving the electrode assembly 10 and an electrolyte solution therein. An opening connecting external and internal spaces may be formed at one side of the cuboid shape. The opening may allow the electrode assembly 10 to be inserted into the case 15.

The cap plate 20 may be installed in the opening of the case 15 to seal the case 15. For example, the case 15 and the cap plate 20 may be made of aluminum and may be welded to each other.

Further, the cap plate 20 may include an electrolyte injection opening 29, a vent hole 24, and terminal holes H1 and H2. The electrolyte injection opening 29 may allow electrolyte solution to be injected into the case 15, e.g., after coupling the cap plate 20 with the case 15. After injecting the electrolyte solution, the electrolyte injection opening 29 may be sealed by a sealing cap 27.

The vent hole 24 may be sealed by the vent plate 25, and may be configured to discharge an internal pressure of the unit cell 100. When the internal pressure of the unit cell 100 reaches a predetermined pressure, the vent plate 25 may be cut (e.g., may rupture) to open the vent hole 24. The vent plate 25 may have a notch 25a for inducing the cut.

The negative terminal 21 and the positive terminal 22 may be installed in the terminal holes H1 and H2 of the cap plate 20 and may be electrically connected to the electrode assembly 10. That is, the negative terminal 21 may be electrically connected to the negative electrode 11 of the electrode assembly 10, and the positive terminal 22 may be electrically connected to the positive electrode 12 of the electrode assembly 10. Accordingly, the electrode assembly 10 may be drawn out (e.g., electrically connected) to the outside of the case 15 through the negative terminal 21 and the positive terminal 22.

The negative terminal 21 and the positive terminal 22 may have the same structure inside of the cap plate 20, and thus the same structures will be described together. Since the negative terminal 21 and the positive terminal 22 may have different structures outside of the cap plate 20, the different structures will be separately described.

The negative and positive terminals 21 and 22 may include respective rivet terminals 21a and 22a installed in the terminal holes H1 and H2 of the cap plate 20, flanges 21b and 22b (which may be formed having a sufficient width to integrate the rivet terminals 21a and 22a to the inside of the cap plate 20), and plate terminals 21c and 22c (which may disposed at the outside of the cap plate 20 and may be connected to the rivet terminals 21a and 22a by, e.g., riveting or welding).

Negative and positive gaskets 36 and 37 may be installed between the rivet terminals 21a and 22a of the negative and positive terminals 21 and 22 and the insides of the terminal holes H1 and H2 of the cap plate 20, and thus may seal and electrically insulate a space between the rivet terminals 21a and 22a of the negative and positive terminals 21 and 22 and the cap plate 20.

The negative and positive gaskets 36 and 37 may also extend between the flanges 21b and 22b and the inside of the cap plate 20 to further seal and electrically insulate a space between the flanges 21b and 22b and the cap plate 20. The negative and positive gaskets 36 and 37 may substantially prevent the electrolyte solution from leaking though the terminal holes H1 and H2 in which the negative and positive terminals 21 and 22 are installed.

Negative and positive electrode lead tabs 51 and 52 may electrically connect the negative and positive terminals 21 and 22 to the negative and positive electrodes 11 and 12 of the electrode assembly 10, respectively. That is, the negative and positive electrode lead tabs 51 and 52 may be coupled with lower ends of the rivet terminals 21a and 22a (e.g., to caulk the lower ends). Thus, the negative and positive electrode lead tabs 51 and 52 may be supported by the flanges 21b and 22b (and thus may be connected to the lower ends of the rivet terminals 21a and 22a).

Negative and positive insulation members 61 and 62 may be installed between the negative and positive electrode lead tabs 51 and 52 and the cap plate 20, respectively, and thus may electrically insulate the negative and positive electrode lead tabs 51 and 52 and the cap plate 20 from each other. Further, a first side of the negative and positive insulation members 61 and 62 may be coupled with the cap plate 20, and a second side, opposite the first side, may cover the negative and positive electrode lead tabs 51 and 52. Thus, the rivet terminals 21a and 22a, the flanges 21b and 22b, and the connection structure therebetween may be stabilized.

The external short-circuit part 40 will be described below with reference to the plate terminal 21c of the negative terminal 21. A top plate 46 will be described with reference to the plate terminal 22c of the positive terminal 22.

The external short-circuit part 40, which may be at the negative terminal 21 side, may include a short-circuit tab 41 and a short-circuit member 43 which may be separated or short-circuited (relative to each other) depending on an internal pressure. The short-circuit tab 41 may be electrically connected to the rivet terminal 21a of the negative terminal 21, and may be disposed at the outside of the cap plate 20 with an insulation member 31 interposed therebetween.

The insulation member 31 may be installed between the short-circuit tab 41 and the cap plate 20, and thus the short-circuit tab 41 and the cap plate 20 may be electrically isolated from each other. That is, the cap plate 20 may be maintained to be electrically insulated from the negative terminal 21.

The short-circuit tab 41 and the plate terminal 21c may be coupled with an upper end of the rivet terminal 21a (e.g., to caulk the upper end). Accordingly, the short-circuit tab 41 and the plate terminal 21c may be fixed to the cap plate 20 with the insulation member 31 interposed therebetween.

The short-circuit member 43 may be installed in the short-circuit hole 42 formed at the cap plate 20. The short-circuit tab 41 may be connected to the negative terminal 21 to extend along the outside of the short-circuit member 43 (e.g., to overlap the short-circuit member 43). Accordingly, the short-circuit tab 41 and the short-circuit member 43 may correspond to the short-circuit hole 42 and may face each other to be maintained in a separated state (illustrated by the solid line), and may form a short-circuit state (illustrated by the phantom line) by inversion of the short-circuit member 43 when the internal pressure of the rechargeable battery is increased (e.g., above a predetermined pressure).

The top plate 46 of the positive terminal 22 side may electrically connect the plate terminal 22c of the positive terminal 22 and the cap plate 20. For example, the top plate 46 may be interposed between the plate terminal 22c and the cap plate 20, and the rivet terminal 22a may pass through the top plate 46.

Accordingly, the top plate 46 and the plate terminal 22c may be coupled with the upper end of the rivet terminal 22a (e.g., to caulk the upper end). The plate terminal 22c may be installed at the outside of the cap plate 20 with the top plate 46 interposed therebetween.

Also, the positive gasket 37 may be installed to further extend between the rivet terminal 22a and the top plate 46. That is, the positive gasket 37 may substantially prevent the rivet terminal 22a and the top plate 46 from being electrically connected to each other. That is, the rivet terminal 22a may be electrically connected to the top plate 46 through the plate terminal 22c.

Figure 5:
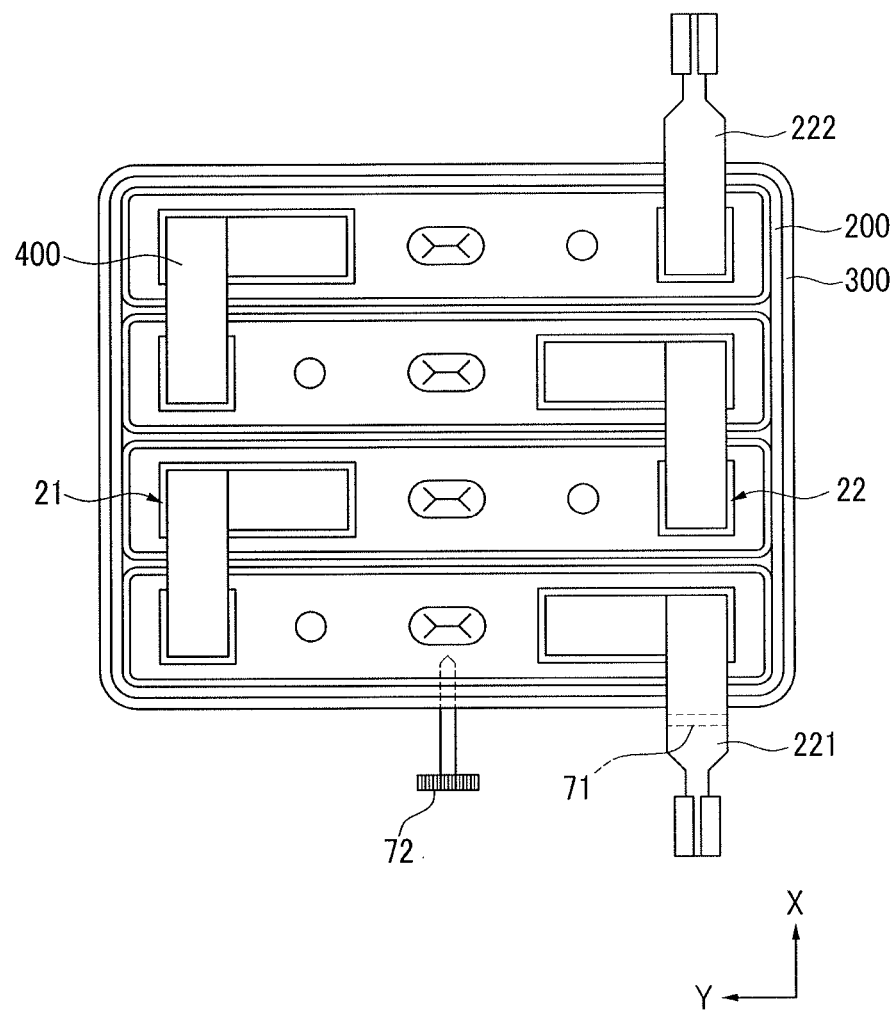
FIG. 5 illustrates a plan view of the rechargeable battery module illustrated in FIG. 1.

FIG. 5 illustrates a plan view of the rechargeable battery module illustrated in FIG. 1. Referring to FIGS. 1, 2, and 5, the unit cells 100 may be disposed to be adjacent to each other and electrically connected to each other through the busbars 400.

For example, the busbar 400 may connect the negative terminal 21 and the positive terminal 22 of adjacent unit cells 100 in series. Further, the busbars may connect the unit cells in parallel (not shown).

A first final terminal 221 (hereinafter, referred to as a "final negative terminal") may be connected to the negative terminal 21 of a first side outermost unit cell 100, and a second final terminal 222 (hereinafter, referred to as a "final positive terminal") may be connected to the positive terminal 22 of a second side outermost unit cell 100, the remaining unit cells 100 being sandwiched between the first and second side outermost unit cells.

The case 15 may be electrically connected to the positive terminal 22, and the adjacent unit cells 100 may be disposed to be separated from, or otherwise electrically insulated from, each other. In this state, the insulation film 200 may surround the sides of the unit cells 100. That is, the unit cells 100 may be electrically insulated from each other and received in the insulation film 200.

The conductive member 300 may surround the side of the insulation film 200 opposite the units cells 100, and may be electrically connected to the negative terminal 21. Accordingly, the conductive member 300 may be electrically insulated from the cases 15 of the unit cells 100 with the insulation film 200 therebetween. In this case, the outer conductive member 300 may have a negative polarity, and the cases 15 of the unit cells 100 may have positive polarities.

The conductive member 300 and the negative terminal 21 may be electrically connected to each other by a connection member 71. That is, the conductive member 300 may have a negative polarity. The connection member 71 may be used in plural to connect the negative terminal of each of the unit cells to the conductive member (not shown)

For example, the connection member 71 may connect the conductive member 300 and the final negative terminal 221 to give a negative polarity to the conductive member 300. In this case, the case 15 may have a positive polarity.

As described above, the conductive member 300 may be disposed at the outside of the unit cells 100, and thus may avoid corrosion (e.g., due to the electrolyte solution filled in the unit cells 100), and thus may be made of various materials. For example, the conductive member 300 may be made of Cu, Al, stainless steel, and the like.

As shown in FIG. 5, when a conductive foreign object 72 (for example, a nail) penetrates into a first side unit cell 100 from the one side of the rechargeable battery module, an external short-circuit may occur between the case 15 of the unit cell 100 and the outer conductive member 300, that is, at the outside of the unit cell 100.

Accordingly, current charged in the electrode assembly of all of the unit cells 100 (which form the rechargeable battery module) may be discharged at the outside of the unit cells 100. As a result, voltage drop may be more efficiently implemented in the electrode assembly 10 of the unit cells 100. In this case, fuses (not shown) provided in the unit cells 100 may be disconnected, and thus a state of charge (SOC) may be reduced quickly.

In addition, in the case where the conductive foreign object 72 reaches the electrode assembly 10, most of the current charged in the electrode assembly 10 may be maintained in a discharged state. Accordingly, risk of the ignition may be substantially prevented in the rechargeable battery module and safety may be improved.

Additionally, the unit cell may further include an inner conductive member (not shown) having a negative polarity in the case. In the state where the fuse is not disconnected when the conductive foreign object penetrates thereinto, the case having a positive polarity and the inner conductive member (not shown) having a negative polarity may be short-circuited from each other, and as a result, the slightly remaining state of charge (SOC) may be reduced. That is, influence on the penetration of the conductive foreign object may be decreased in the rechargeable battery module.

The conductive member 300 may surround all four directional sides of the unit cells 100, and thus, even in the case where the conductive foreign object 72 penetrates from the front, rear, left, and/or right sides of the rechargeable battery module, an external short-circuit may occur between the case 15 of the unit cell 100 and the outer conductive member 300, that is, at the outside of the unit cell 100.

Also, the rechargeable battery module may be inserted (i.e., installed) into a module housing which may be separately provided. In this case, in the rechargeable battery module, the conductive member 300 (which is provided at the outermost of the rechargeable battery module) may be inserted into the module housing, and for electric safety, an insulation film (not show) may be attached to the outer surface of the conductive member 300 and may also be inserted into the module housing (not shown) (i.e., and thus the conductive member 300 may be insulated from the module housing).

Figure 6:
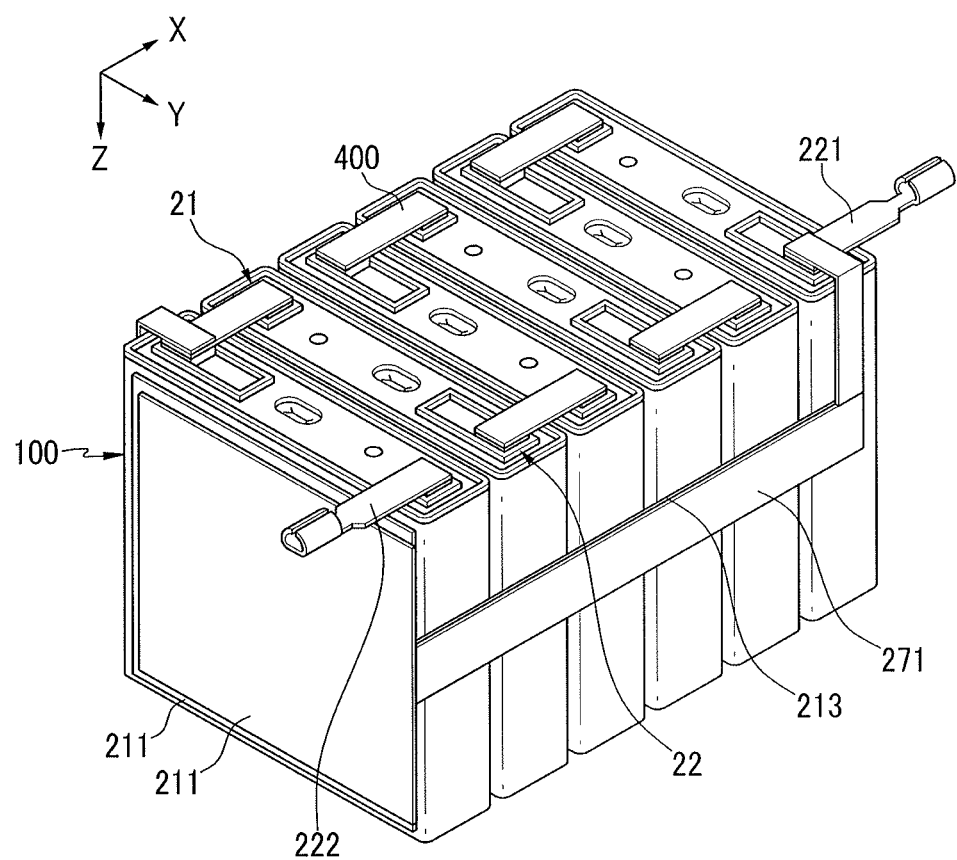
FIG. 6 illustrates a perspective view of a rechargeable battery module according to an embodiment.
Figure 7:
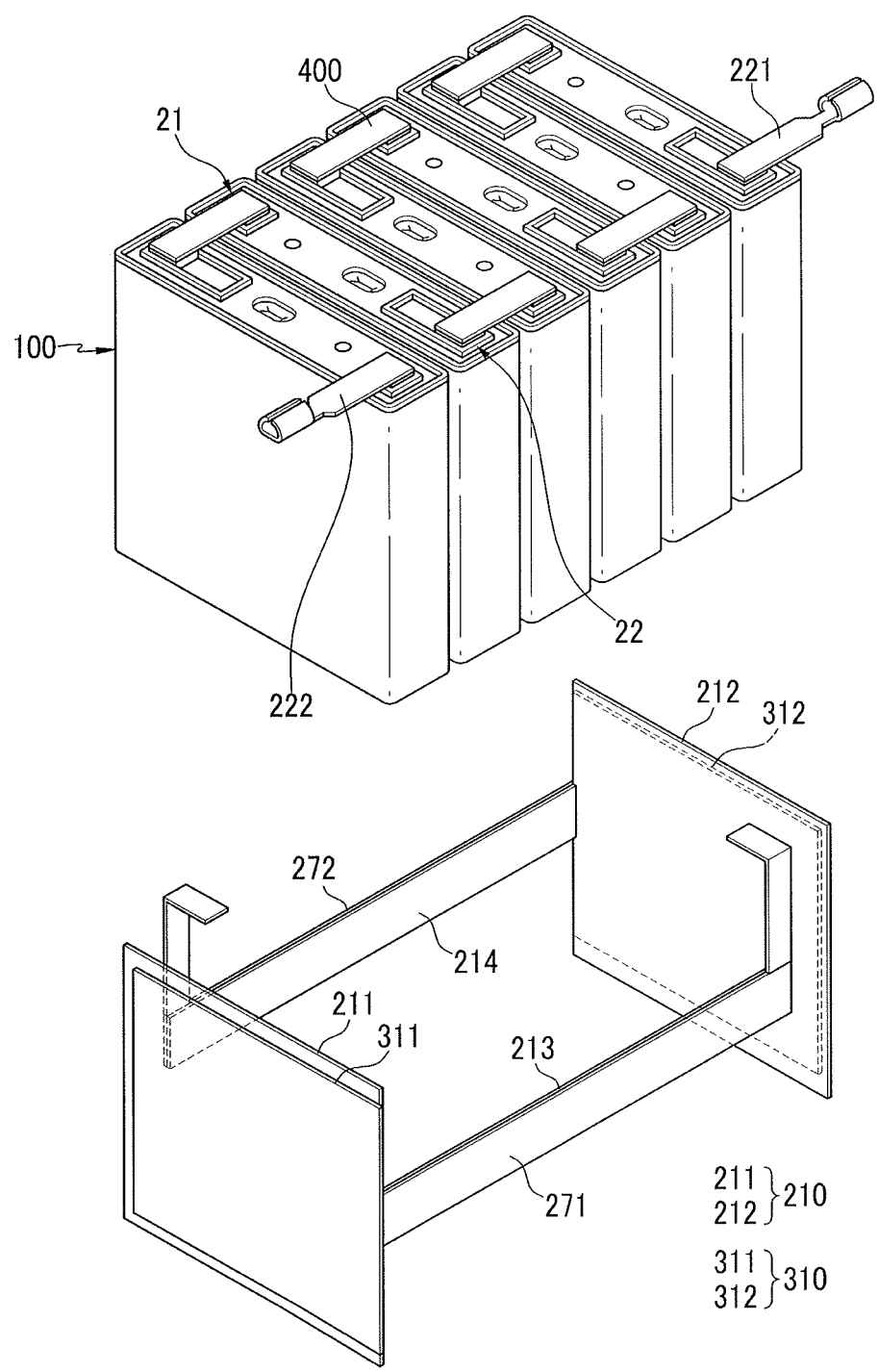
FIG. 7 illustrates an exploded perspective view of the rechargeable battery module illustrated in FIG. 6.

FIG. 6 illustrates a perspective view of a rechargeable battery module according to an embodiment. FIG. 7 is an exploded perspective view of the rechargeable battery module illustrated in FIG. 6. Elements in the rechargeable battery module of FIGS. 6 and 7 may be the same as the elements discussed above, and a detailed description thereof will not be repeated.

Referring to FIGS. 6 and 7, an insulation film 210 may include a first insulation film 211 and a second insulation film 212 which may be disposed at the sides of both ends (i.e., opposite ends) of an arrangement direction (x-axial direction) of the unit cells 100. A conductive member 310 may include a first conductive member 311 disposed at the outside of the first insulation film 211 and a second conductive member 312 disposed at the outside of the second insulation film 212.

The first conductive member 311 may be electrically insulated from the a first side unit cell 100 by the first insulation film 211, and the second conductive member 312 may be electrically insulated from a second side unit cell 100 by the second insulation film 212.

The first and second conductive members 311 and 312 and the negative terminals 21 and 21 may be electrically connected to each other by the first and second connection members 271 and 272. That is, the first connection member 271 may be connected at a first side to the first conductive member 311 and may be connected at a second side, opposite the first side, to the negative terminal 21 of the first side unit cell 100 to give a negative polarity to the first conductive member 311. For example, the first connection member 271 may be connected to the final negative terminal 221. The first conductive member 311 and the first connection member 271 may be integrally formed and may be curved along the outer edge of the unit cells 100 (i.e., the first conductive member 311 and the first connection member 271 may be on different sides of the unit cells 100).

The second connection member 272 may be connected at a first side to the second conductive member 312 and may be connected at a second side, opposite the first side, to the negative terminal 21 of the second side unit cell 100 (i.e., the unit cell at the opposite side of the stack of unit cells as the first side unit cell) to give a negative polarity to the second conductive member 312. For example, the second connection member 272 may be connected to the busbar 400 of the negative terminal 21 which is positioned farthest away from the final negative terminal 221. The second conductive member 312 and the second connection member 272 may be integrally formed to be curved along the outer edge of the unit cells 100 (i.e., the second conductive member 312 and the second connection member 272 may be on different sides of the unit cells 100).

For example, the first connection member 271 may be disposed to be elongated along an x-axial direction on one side (e.g., left side) of the rechargeable battery module along a direction (y-axial direction) crossing the arrangement direction (x-axial direction) of the unit cells 100, and the second connection member 272 may be disposed to be elongated along the x-axial direction from the other side (e.g., right side) of the rechargeable battery module along the crossing direction (y-axial direction). That is, the first and second connection members 271 and 272 may be disposed at the left and right sides of the outer edge of the rechargeable battery module, with the unit cells 100 therebetween.

The insulation film 210 may further include a third insulation film 213 and a fourth insulation film 214 which may be disposed at the sides of both ends in the y-axial direction of the unit cells 100. The third insulation film 213 may be disposed between the first connection member 271 and the unit cells 100 at one side (left side) of the crossing direction (y-axial direction) to electrically insulate the first connection member 271 and the unit cells 100 from each other.

The fourth insulation film 214 may be disposed between the second connection member 272 and the unit cells 100 at the other side (right side) of the crossing direction (y-axial direction) to electrically insulate the second connection member 272 and the unit cells 100 from each other. The third and fourth insulation films 213 and 214 may be formed to correspond to the first and second connection members 271 and 272. The first and second connection members 271 and 272 may have negative polarities, and the case 15 of the unit cells 100 may have a positive polarity.

The rechargeable battery module may be formed such that the insulation film 200 and the conductive member 300 surround all the sides of the unit cells 100. The rechargeable battery module may also be formed such that the insulation film 210 and the conductive member 310 are disposed at both sides of the unit cells 100 along the y-axial direction, from among all of the sides of the unit cells 100.

As described above, if the conductive member 310, (i.e., the first and second conductive members 311 and 312), are disposed at opposite sides of the unit cells 100 along the arrangement direction (x-axial direction) of the unit cells 100, when the conductive foreign object penetrates from the sides of the rechargeable battery module having the first and second conductive members 311 and 312, an external short-circuit may occur between the case 15 of the unit cell 100 and the first and second conductive members 311 and 312, that is, at the outside of the unit cell 100.

Further, in the case where the conductive foreign object penetrates from the left and right sides of the rechargeable battery module (i.e., along the crossing y-axial direction), the external short-circuit may also occur between the case 15 of the unit cell 100 and the first and second connection members 271 and 272.

By way of summary and review, a rechargeable battery may be used as a single cell (e.g., in a small-sized electronic device), or it may be used as a module in which a plurality of cells are electrically connected (e.g., for driving a motor). The rechargeable battery module may be formed by connecting electrode terminals of unit cells with busbars. In the case where a conductive foreign object, such as a nail or an awl, penetrates from the outside to the inside of the rechargeable battery module, a short circuit may occur in the inside of the rechargeable battery module. When the short circuit occurs, an internal temperature of the unit cell of the rechargeable battery module may rapidly increase, and the unit cells and the rechargeable battery module may be ignited or exploded.

The foregoing safety concerns may be mitigated by the rechargeable battery module disclosed herein, which has the advantage of improved safety for penetration of conductive foreign objects. When a conductive foreign object penetrates one of the sides of the rechargeable battery module having a conductive members, an external short-circuit may occur between the case of the unit cell and the conductive member. Accordingly, current may be discharged at the outside of the unit cells. As a result, voltage drop may be more efficiently implemented in the unit cells. In this case, a state of charge (SOC) may be reduced quickly, and most of the current charged in the unit cells may be maintained in a discharged state. Accordingly, risk of the ignition may be substantially prevented in the rechargeable battery module and safety may be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A rechargeable battery module, comprising:
   unit cells that are adjacent to each other, each of the unit cells being configured as a rechargeable battery and including a first electrode terminal, a second electrode terminal, and a case that is electrically connected to the second electrode terminal;
   an insulation film on at least one side among all sides of the unit cells; and
   a conductive member on a side the insulation film, the conductive member being electrically connected to the first electrode terminal of at least one of the unit cells,
   wherein the insulation film and the conductive member overlap each other, the insulation film being between the conductive member and at least one case of the unit cells to separate therebetween,
   wherein the unit cells define a module, the insulation film continuously surrounding an entire perimeter of the module, and
   wherein the conductive member continuously surrounds the insulation film along the entire perimeter of the mod- ule, the insulation film insulating the conductive member from respective cases of all the unit cells.

2. The rechargeable battery module as claimed in claim 1, wherein:
the unit cells are connected to each other by busbars,
a first final terminal is connected to the first electrode terminal of a first unit cell at a first side of the rechargeable battery module, and
a second final terminal is connected to the second electrode terminal of a second unit cell at a second side of the rechargeable battery module, the second side being opposite first side.

3. The rechargeable battery module as claimed in claim 2, further comprising a connection member, wherein a first side of the connection member is connected to the conductive member and a second side of the connection member is connected to the first final terminal so that the conductive member has a same polarity as the first electrode terminal of the first unit cell, a connection between the second side of the connection member and the first final terminal being external with respect to the rechargeable battery module.

4. The rechargeable battery module as claimed in claim 1, further comprising a connection member that is external in its entirety with respect to all the unit cells and to the conductive member, wherein:
the unit cells are connected to each other by busbars, and
a first side of the connection member is connected to the conductive member and a second side of the connection member is connected to the first electrode terminal of a first unit cells so that the conductive member has a same polarity as the first electrode terminal of the first unit cell.

5. The rechargeable battery module as claimed in claim 1, wherein:
the first electrode terminal of each of the units cells and the conductive member have a first polarity,
the second electrode terminal and the case of each of the unit cells have a second polarity, and
the first polarity is different than the second polarity.

6. The rechargeable battery module as claimed in claim 1, wherein:
the unit cells are arranged in an arrangement direction, and the insulation film includes
a first insulation film at a first side of the unit cells along the arrangement direction, and
a second insulation film at a second side of the unit cells, opposite the first side, along the arrangement direction, all the unit cells being arranged between the first and second insulation films.

7. A rechargeable battery module, comprising:
unit cells that are adjacent to each other and are arranged in an arrangement direction, each of the unit cells being configured as a rechargeable battery and including a first electrode terminal, a second electrode terminal, and a case that is electrically connected to the second electrode terminal;
an insulation film on at least one side among all sides of the unit cells, the insulation film including:
a first insulation film at a first side of the unit cells along the arrangement direction, and
a second insulation film at a second side of the unit cells, opposite the first side, along the arrangement direction, all the unit cells being arranged between the first and second insulation films; and a conductive member on a side the insulation film, the conductive member being electrically connected to the first electrode terminal of at least one of the unit cells, and including:
a first conductive member on the first insulation film, the first insulation film insulating the first conductive member from a case of a unit cell closest to the first side of the unit cells, and
a second conductive member on the second insulation film, the second insulation film insulating the second conductive member from a case of a unit cell closest to the second side of the unit cells,
wherein the insulation film and the conductive member overlap each other, the insulation film being between the conductive member and at least one case of the unit cells to separate therebetween.

8. The rechargeable battery module as claimed in claim 7, further comprising a first connection member and a second connection member, wherein:
the unit cells are connected to each other by busbars,
a first side of the first connection member is connected to the first conductive member and a second side of the first connection member is connected to the first electrode terminal of a first unit cell so that the first conductive member has a same polarity as the first electrode terminal of the first unit cell, and
a first side of the second connection member is connected to the second conductive member and a second side of the second connection member is connected to the first electrode terminal of a second unit cell so that the second conductive member has a same polarity as the first electrode terminal of the second unit cell.

9. The rechargeable battery module as claimed in claim 8, wherein:
the first connection member is on a third side of the unit cells in a crossing direction crossing the arrangement direction, and
the second connection member is on a fourth side of the unit cells, opposite the third side, in the crossing direction.

10. The rechargeable battery module as claimed in claim 9, further comprising:
a third insulation film between the first connection member and the unit cells at the third side; and
a fourth insulation film between the second connection member and the unit cells at the fourth side.

11. The rechargeable battery module as claimed in claim 9, wherein:
the first connection member overlaps each of the unit cells on the third side, and
the second connection member overlaps each of the unit cells on the fourth side.

12. The rechargeable battery module as claimed in claim 9, wherein:
the first connection member and the first conductive member are integrally formed, and
the second connection member and the second conductive member are integrally formed.

13. The rechargeable battery module as claimed in claim 8, wherein the first insulation film is on the second unit cell and the second insulation film is on the first unit cell.

14. The rechargeable battery module as claimed in claim 8, wherein:
a first final terminal is connected to the first electrode terminal of the first unit cell and the first connection member is connected to the first electrode terminal of the first unit cell through the first final terminal, and a first busbar of the busbars is connected to the first electrode terminal of the second unit cell and the second connection member is connected to the first electrode terminal of the second unit cell through the first busbar.

15. The rechargeable battery module as claimed in claim 1, wherein the case of each unit cell is electrically insulated from the cases of the other unit cells.

16. The rechargeable battery module as claimed in claim 1, wherein the conductive member is electrically connected to the first electrode terminals of at least two of the unit cells, the conductive member and a connection member thereon being outermost members of the rechargeable battery module.

17. The rechargeable battery module as claimed in claim 16, wherein the first electrode terminals of the at least two of the unit cells have a same polarity.

18. The rechargeable battery module as claimed in claim 1, wherein the rechargeable battery is inside an enclosure, and a second insulating film is between the conductive member and the enclosure.

* * * * *